United States Patent
Takamatsu et al.

(10) Patent No.: US 11,974,587 B2
(45) Date of Patent: May 7, 2024

(54) WATER-CONTAINING FOAM-CONTAINING CHOCOLATE

(71) Applicant: LOTTE CO., LTD., Tokyo (JP)

(72) Inventors: Hiroyuki Takamatsu, Saitama (JP); Yoko Ichimasa, Saitama (JP); Shoko Ando, Saitama (JP); Etsumi Abe, Saitama (JP)

(73) Assignee: LOTTE CO., LTD., Tokyo (JP)

( * ) Notice: Subject to any disclaimer, the term of this patent is extended or adjusted under 35 U.S.C. 154(b) by 747 days.

(21) Appl. No.: 17/056,743

(22) PCT Filed: Apr. 24, 2019

(86) PCT No.: PCT/JP2019/017359
§ 371 (c)(1),
(2) Date: Nov. 18, 2020

(87) PCT Pub. No.: WO2019/220893
PCT Pub. Date: Nov. 21, 2019

(65) Prior Publication Data
US 2021/0251253 A1 Aug. 19, 2021

(30) Foreign Application Priority Data
May 18, 2018 (JP) ................. 2018-096461

(51) Int. Cl.
A23G 1/52 (2006.01)
A23G 1/00 (2006.01)
A23P 30/40 (2016.01)

(52) U.S. Cl.
CPC ............. *A23G 1/52* (2013.01); *A23G 1/003* (2013.01); *A23P 30/40* (2016.08); *A23G 2200/10* (2013.01)

(58) Field of Classification Search
None
See application file for complete search history.

(56) References Cited

U.S. PATENT DOCUMENTS

| 2006/0134304 A1 | 6/2006 | Harada et al. |
| 2013/0323390 A1 | 12/2013 | Kawamura et al. |

FOREIGN PATENT DOCUMENTS

| CN | 105050416 A | 11/2015 | |
| JP | 62-248454 A | 10/1987 | |
| JP | 05-111350 A | 5/1993 | |
| JP | 2002-218910 A | 8/2002 | |
| JP | 2004-357643 A | 12/2004 | |
| JP | 2009-201366 A | 9/2009 | |
| JP | 2010-207196 A | 9/2010 | |
| JP | 2011-205940 A | 10/2011 | |
| JP | 2014-027890 A | 2/2014 | |
| JP | 2014-103879 A | 6/2014 | |
| JP | 2016-002015 A | 1/2016 | |
| JP | 2016-002016 A | 1/2016 | |
| JP | 2017-108744 A | 6/2017 | |
| WO | WO 2004/062384 A1 | 7/2004 | |
| WO | WO 2014/163011 A1 | 10/2014 | |
| WO | WO-2018041875 A1 * | 3/2018 | ............... A23G 1/52 |

OTHER PUBLICATIONS

Specific gravity values of foods by http://www.fao.org/3/ap815e/ap815e.pdf. (Year: 2012).*
International Search Report from International Patent Application No. PCT/JP2019/017359, dated Aug. 6, 2019.
Office Action dated Mar. 24, 2020, in Japanese Patent Application No. 2018-096461.
International Preliminary Report on Patentability from International Patent Application No. PCT/JP2019/017359, dated Dec. 3, 2020.
Office Action dated May 11, 2021, in Japanese Patent Application No. 2020-165089.
Office Action dated Feb. 18, 2023, in Chinese Patent Application No. 201980033556.1.

* cited by examiner

*Primary Examiner* — Jyoti Chawla
(74) *Attorney, Agent, or Firm* — Potomac Law Group, PLLC

(57) ABSTRACT

The present invention provides a water-containing foam-containing chocolate containing 16 wt % or more and 55 wt % or less of water, the water-containing foam-containing chocolate having new texture that is smooth, fluffy, and soft even in a freezing temperature range and having processability at room temperature and an excellent shape retention property at room temperature and in the freezing temperature range.

3 Claims, 2 Drawing Sheets

WATER-CONTAINING FOAM-CONTAINING CHOCOLATE

TECHNICAL FIELD

The present invention relates to a water-containing foam-containing chocolate, which enables flavor of chocolate to be sufficiently sensed even in a freezing temperature range, and which exhibits new texture that is smooth, fluffy, and soft.

BACKGROUND ART

When general chocolate is frozen, the texture of chocolate becomes hard and the flavor of chocolate becomes difficult to be sensed. Therefore, as a method of softening chocolate, there has hitherto been adopted a method involving softening the texture by kneading fresh cream or liquor into chocolate to make a water-containing chocolate. However, those water-containing chocolates also have problems in that the texture is still hard at a temperature of 0° C. or less, that is, in a freezing temperature range, and the flavor of chocolate is difficult to be sensed.

In order to solve the problems, various attempts have hitherto been made.

For example, in Patent Literature 1, there is described a water-containing chocolate material that can be filled into ice cream distributed in the freezing temperature range so that rich flavor of raw chocolate can be tasted as it is.

In addition, in Patent Literature 2, there is described a water-containing chocolate which is soft in the freezing temperature range, and which is less changed in physical properties over time.

CITATION LIST

Patent Literature

PTL 1: Japanese Patent Application Laid-Open No. 2011-205940
PTL 2: WO 2014/163011 A1

SUMMARY OF INVENTION

Technical Problem

However, the water-containing chocolate material described in Patent Literature 1 has a problem in that, although chocolate after thawing has smooth physical properties, the texture is still hard in the freezing temperature range.

In addition, the water-containing chocolate described in Patent Literature 2 has a problem in that it is required to use a monosaccharide instead of sugar, and hence the flavor of chocolate is unsatisfactory.

Solution to Problem

The present invention has an object to provide a water-containing foam-containing chocolate, which enables flavor of chocolate to be sufficiently sensed even in a freezing temperature range, and which exhibits new texture that is smooth, fluffy, and soft.

The inventors of the present invention have made extensive investigations, and as a result, have found that the water-containing foam-containing chocolate, which enables flavor of chocolate to be sufficiently sensed even in the freezing temperature range, and which exhibits new texture that is smooth, fluffy, and soft, is obtained by whipping a water-containing chocolate of an oil-in-water type under certain conditions in a production step.

That is, the present invention provides a water-containing foam-containing chocolate of an oil-in-water type including 16 wt % or more and 55 wt % or less of water.

Advantageous Effects of Invention

According to the present invention, the water-containing foam-containing chocolate, which enables flavor of chocolate to be sufficiently sensed even in the freezing temperature range, which has new texture that is smooth, fluffy, and soft, and which has processability and an excellent shape retention property at room temperature and in the freezing temperature range, is provided.

DESCRIPTION OF EMBODIMENTS

Figure 1:
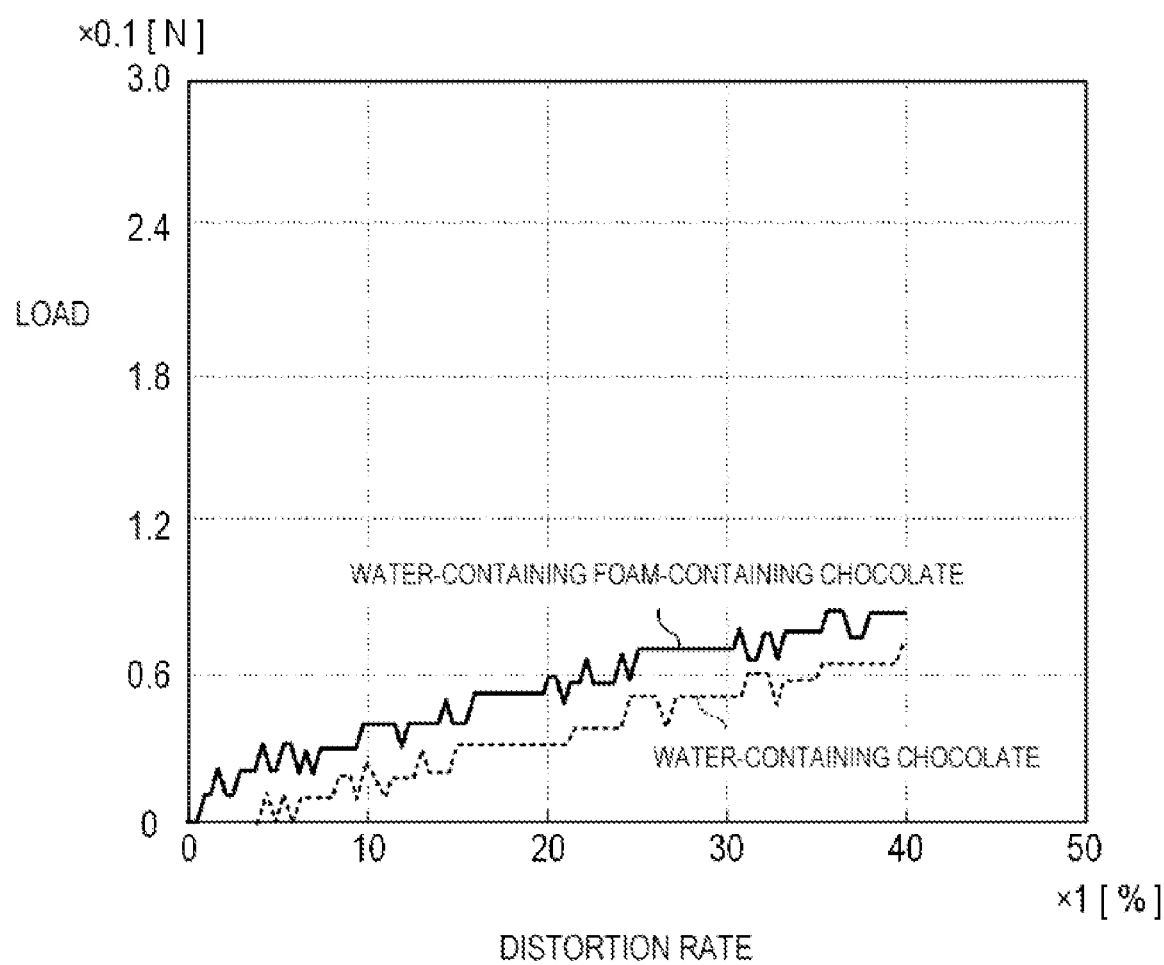
FIG. 1 is a graph for showing a relationship between the distortion rate of each of a water-containing chocolate containing 40 wt % of water and a water-containing foam-containing chocolate after whipping the water-containing chocolate and the load at 23° C.

The present invention relates to a water-containing foam-containing chocolate of an oil-in-water type including 16 wt % or more and 55 wt % or less of water.

<Material>

Chocolate dough used in the water-containing foam-containing chocolate of the present invention is not particularly limited as long as the chocolate dough is chocolate commonly used by a person skilled in the art, and contains sugars, such as sugar, lactose and the like, vegetable oils, such as cacao mass, whole milk powder and/or skim milk powder, and fats, cocoa butter, and the like, emulsifiers, such as lecithin, and flavoring agents. The blending amounts of those ingredients in the chocolate dough are as follows. The chocolate dough contains 10 wt % or more and 50 wt % or less of sugar, 10 wt % or more and 50 wt % or less of cacao mass, 0 wt % or more and 40 wt % or less of whole milk powder and/or skim milk powder. Those blending amounts may be appropriately changed within a range in which 30 wt % or more and 60 wt % or less of a fatty ingredient is contained in the chocolate dough.

The chocolate dough may be chocolate that requires a tempering operation or chocolate that does not require the tempering operation.

In the water-containing foam-containing chocolate of the present invention, a water-containing chocolate contains air bubbles. Therefore, first, it is required to mix the above-mentioned chocolate dough with aqueous ingredients to produce the water-containing chocolate. As the aqueous ingredients, water, liquor, fresh cream, fruit juice, meringue, and the like may be used. The content of water in the water-containing foam-containing chocolate falls preferably within a range of 16 wt % or more and 55 wt % or less. In addition, from the viewpoint of texture and a shape retention property, the content of water falls more preferably within a range of 16 wt % or more and 50 wt % or less, still more preferably within a range of 30 wt % or more and 50 wt % or less, particularly preferably within a range of 30 wt % or more and 40 wt % or less.

The hardness of the water-containing foam-containing chocolate of the present invention is represented by a load at which a distortion rate is 40%. When the load at which the distortion rate at −18° C. is 40% is 1.5 N or more and 40.5 N or less, the texture in the freezing temperature range is sufficiently soft, and the flavor of chocolate can be sufficiently sensed. Regarding the hardness of the water-containing foam-containing chocolate of the present invention, when the load at which the distortion rate at room temperature (23° C.) is 40% is 0.05 N or more and 0.60 N or less, the hardness at −18° C. easily falls within the above-mentioned ranges.

In addition, it is preferred that the specific gravity at room temperature (23° C.) of the water-containing foam-containing chocolate be 0.2 or more and 1.0 or less. When the specific gravity of the water-containing foam-containing chocolate falls within the above-mentioned ranges, the water-containing foam-containing chocolate of the present invention in the freezing temperature range can exhibit texture that is smooth and fluffy. In addition, the water-containing foam-containing chocolate of the present invention can achieve physical properties in accordance with various forms through adjustment of the specific gravity.

It is preferred that, in addition to the specific gravity satisfying the above-mentioned ranges, the ratio of air bubbles each having a circle-equivalent diameter of 30 μm or more and 50 μm or less be 50% or more among air bubbles each having a circle-equivalent diameter of 20 μm or more in the air bubbles of the water-containing foam-containing chocolate, because the water-containing foam-containing chocolate of the present invention in the freezing temperature range exhibits texture that is more fluffy and soft.

It is preferred that the ratio of the air bubbles be 70% or more because fluffy softness of texture is further increased.

<Production Method>

A method of producing the water-containing foam-containing chocolate of the present invention is described below.

The above-mentioned materials are measured and mixed. When water, liquor, fresh cream, and fruit juice are used as aqueous ingredients, those aqueous ingredients are mixed at this time. The mixture is warmed and stirred until all the materials are dissolved. When all the materials are dissolved, the resultant is emulsified through use of a high-speed stirrer. The emulsification may be performed, for example, by stirring at 1,000 rpm or more for 2 minutes or more, but modifications may be appropriately made depending on, for example, the types and ratios of the materials. The mixture after emulsification is cooled to 45° C. or less. Thus, a water-containing chocolate of an oil-in-water type can be obtained. It is preferred that the load at which the distortion rate at room temperature (23° C.) of the water-containing chocolate is 40% be 0.05 N or more and 0.60 N or less because the load at which the distortion rate at −18° C. of the water-containing foam-containing chocolate after whipping is 40% easily reaches 1.5 N or more and 40.5 N or less.

Subsequently, the water-containing chocolate is whipped to obtain the water-containing foam-containing chocolate of the present invention. The whipping is performed on the water-containing chocolate cooled to 45° C. or less through use of a vertical mixer, a continuous whipping machine, or the like so that the water-containing chocolate captures air.

In this case, it is preferred that the viscosity at room temperature (23° C.) of the water-containing foam-containing chocolate before whipping be 20,000 cP or less because the whipping can be performed through use of a general vertical mixer or continuous whipping machine.

The whipping conditions may be any conditions as long as the load at which the distortion rate at −18° C. of the water-containing foam-containing chocolate of the present invention is 40% is 1.5 N or more and 40.5 N or less. In addition, the whipping conditions are more preferably conditions under which the specific gravity of the water-containing foam-containing chocolate after whipping and the circle-equivalent diameter of each air bubble therein satisfy the above-mentioned ranges.

The whipping may be performed through use of, for example, a vertical mixer or a continuous mixer. A commercially available mixer may be used as the vertical mixer or the continuous mixer. The temperature at which the whipping is performed may be set so that the water-containing chocolate has fluidity, and is preferably 50° C. or less. The rotation number of the mixer when the whipping is performed may be set to from 40 rpm to 2,000 rpm.

In addition, when meringue is used as the aqueous ingredient, the water-containing foam-containing chocolate produced in the foregoing and meringue are mixed with each other. When the water-containing foam-containing chocolate and meringue are uniformly mixed with each other through use of, for example, a hopper or a continuous whipping machine, the water-containing foam-containing chocolate of the present invention containing meringue can be produced.

The water-containing foam-containing chocolate of the present invention produced in the foregoing can be cooled after being filled into a mold to obtain a product. In addition, ice cream may be wrapped with the water-containing foam-containing chocolate, and the water-containing foam-containing chocolate may also be processed into a whippy ice-cream shape or formed into a spherical shape.

<Methods of Measuring Physical Property Values>

Now, methods of measuring the hardness, viscosity, specific gravity, and maximum diameter of air bubbles of the water-containing foam-containing chocolate are described.

The hardness of the water-containing foam-containing chocolate of the present invention may be determined by the following method through use of a rheometer.

A resin plunger having a diameter of 00 mm is pushed into the water-containing foam-containing chocolate of the present invention at room temperature (23° C.), and a resin plunger having a diameter of 0 mm is pushed into the water-containing foam-containing chocolate of the present invention at −18° C. at a speed of 1 mm/second. The load at which the distortion rate is 40% is set to represent the hardness of the water-containing foam-containing chocolate of the present invention.

The viscosity of the water-containing foam-containing chocolate of the present invention is determined by the following method through use of a B-type viscometer.

The viscosity measured by, after calibrating the viscometer, immersing a rotor in the water-containing foam-containing chocolate of the present invention to a predetermined position and rotating the rotor is defined as the viscosity of the water-containing foam-containing chocolate of the present invention.

The specific gravity of the water-containing foam-containing chocolate of the present invention may be determined by any method, for example, by the following method.

After the volume and weight of a measuring container are measured at room temperature, the water-containing foam-containing chocolate of the present invention is filled into the measuring container, and the weight of the chocolate is measured together with the measuring container into which the chocolate has been filled at room temperature. A difference between the weight of the measuring container and chocolate and the weight of the measuring container is divided by the volume of the measuring container, thereby being capable of determining the specific gravity of the water-containing foam-containing chocolate of the present invention. Any measuring container may be used as the measuring container, but it is preferred that a transparent measuring container be used because a portion into which the chocolate has not been filled is easily found.

The circle-equivalent diameter of each of air bubbles in the water-containing foam-containing chocolate of the present invention may be determined by any method, for example, by the following method.

Under freezing, a slice of the water-containing foam-containing chocolate of the present invention is prepared, and the cross-section thereof is measured with a scanning electron microscope (SEM) to obtain an image (SEM image). The circle-equivalent diameter of each circular portion that appears to be an air bubble of 20 μm or more in the image is determined.

In the image of the slice of the water-containing foam-containing chocolate, circular portions of 20 μm or less are excluded because, regarding such circular portions, air bubbles and fat craters cannot be distinguished from each other.

EXAMPLES

Description is made below by way of Examples and Comparative Examples. However, the present invention is not limited thereto.

Example 1

Production of Water-Containing Foam-Containing Chocolate

A mixture of chocolate-standard chocolate, water, fresh cream, and an emulsifier was stirred with heating in a water bath to dissolve all the materials. After that, the resultant was sterilized at 68° C. for 30 minutes, and the material mixture was emulsified by stirring at 1,000 rpm for 2 minutes or more with a high-speed stirrer (Homomixer MARK II, manufactured by PRIMIX Corporation).

The emulsified product was cooled to 45° C. or less under stirring to obtain a water-containing chocolate containing 37 wt % of water.

Subsequently, the water-containing chocolate obtained in the foregoing was stirred at 45° C. for 90 seconds at 400 rpm through use of a general large mixer to obtain a water-containing foam-containing chocolate. As a result of measuring energization, the obtained water-containing foam-containing chocolate was in an O/W type emulsified state.

(4) Methods of Measuring Physical Property Values

The physical property values of the water-containing foam-containing chocolate prepared in the foregoing were measured by the following method.

(4-1) Hardness

The load at which the distortion rate of each of the water-containing chocolate and the water-containing foam-containing chocolate prepared in the foregoing was 40% was measured at 23° C. and −18° C. through use of a rheometer (RHEONER II CREEP METER RE2-33005C, manufactured by Yamaden Co., Ltd.) equipped with a resin plunger having a diameter of 00 mm. A sample having a cylindrical shape with a diameter of 65 mm and a height of 30 mm was used, and the measurement speed was 1 mm/second. The loads at which the distortion rates at −18° C. and 23° C. of the water-containing chocolate were 40% were 15.80 N and 0.21 N, respectively. In addition, the loads at which the distortion rates at −18° C. and 23° C. of the water-containing foam-containing chocolate were 40% were 3.27 N and 0.19 N, respectively.

Figure 2:
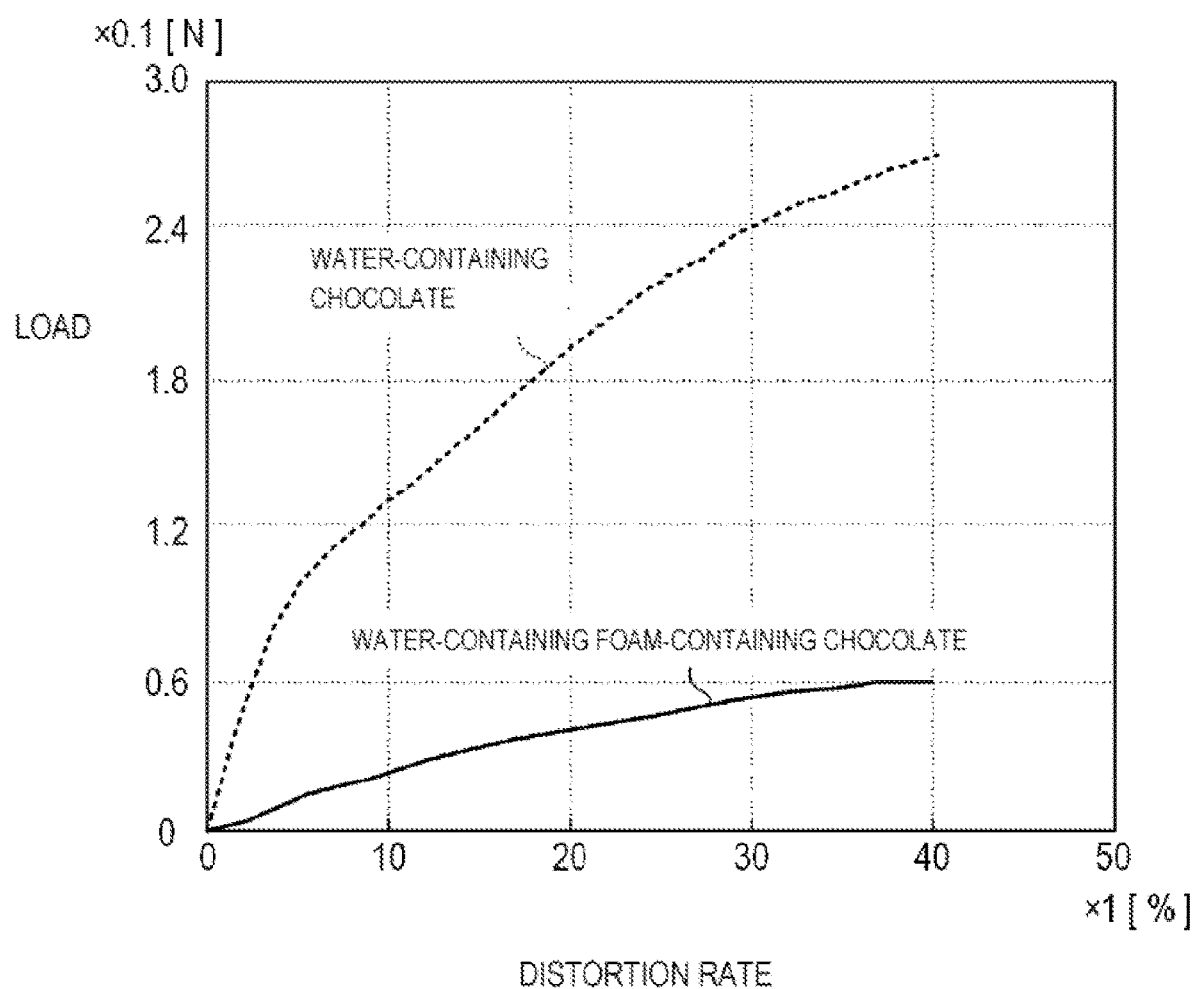
FIG. 2 is a graph for showing a relationship between the distortion rate of each of a water-containing chocolate containing 40 wt % of water and a water-containing foam-containing chocolate after whipping the water-containing chocolate and the load at −18° C.

FIG. 1 is a graph for showing a relationship between the distortion rate of each of the water-containing foam-containing chocolate and the water-containing chocolate and the load at 23° C. FIG. 2 is a graph for showing a relationship between the distortion rate of each of the water-containing foam-containing chocolate and the water-containing chocolate and the load at −18° C. It is understood from FIG. 1 and FIG. 2 that the water-containing chocolate before whipping and the water-containing foam-containing chocolate after whipping have substantially no difference in hardness at 23° C., but the water-containing foam-containing chocolate after whipping becomes significantly soft at −18° C.

(4-2) Specific Gravity

The water-containing foam-containing chocolate was filled into a 200 ml measuring cup and scraped off. The weight of the resultant was measured at 23° C. to obtain a specific gravity of 0.67.

(4-3) Viscosity

The viscosity of each of the water-containing chocolate and the water-containing foam-containing chocolate prepared in the foregoing was measured through use of a B-type viscometer (TVB-10 type viscometer, manufactured by Toki Sangyo Co., Ltd.). The viscosity of the water-containing chocolate at 23° C. was 2,090 cP, and the viscosity of the water-containing foam-containing chocolate was 8,610 cP.

(4-4) Ratio of Air Bubbles Each Having a Circle-Equivalent Diameter of 30 μm or More and 50 μm or Less A slice (7 mm×7 mm) of the water-containing foam-containing chocolate prepared in the foregoing was cut out at −40° C. or less, and an SEM image was obtained from the cross-section of the slice through use of a scanning electron microscope (Helious G4, manufactured by Thermo Fisher Scientific K.K.) at a temperature of from −120° C. to 100° C. The circle-equivalent diameters of air bubbles in the cross-section of the slice were determined from the SEM image, and the ratio of the air bubbles each having a circle-equivalent diameter of 30 μm or more and 50 μm or less was 75%.

Examples 2 to 7

A water-containing chocolate containing 16% to 60% of water was prepared in the same manner as in Example 1. The water-containing chocolate was stirred under the conditions shown in Table 1 to obtain a water-containing foam-containing chocolate of each of Examples 2 to 7. The physical properties of the obtained water-containing foam-containing chocolate were measured in the same manner as in Example 1, and the results are shown in Table 1.

When the raw materials were blended so that the water content fell within a range of from 13 wt % to 15 wt %, the raw material mixture was not emulsified, with the result that a water-containing chocolate was not able to be obtained.

TABLE 1

|  | Example 2 | Example 3 | Example 4 | Example 5 | Example 6 | Example 7 |
|---|---|---|---|---|---|---|
| Water content | 16 wt % | 20 wt % | 30 wt % | 40 wt % | 50 wt % | 60 wt % |
| Stirring condition | 40 rpm (10 minutes) | 40 rpm (10 minutes) | 10,000 rpm (10 minutes) | 10,000 rpm (10 minutes) | 10,000 rpm (10 minutes) | 10,000 rpm (10 minutes) |
| Load before whipping |  |  |  |  |  |  |
| (23° C.) | 0.41N | 0.78N | 0.28N | 0.08N | 0.07N | 0.07N |
| (−18° C.) | 48.3N | 17.0N | 8.70N | 27.0N | 19.9N | 71.2N |
| Load after whipping |  |  |  |  |  |  |
| (23° C.) | 0.26N | 0.57N | 0.35N | 0.09N | 0.09N | 0.06N |
| (−18° C.) | 40.2N | 13.6N | 1.72N | 6.11N | 19.5N | 19.6N |
| Specific gravity | 0.97 | 0.95 | 0.69 | 0.59 | 0.54 | 0.75 |
| Viscosity before whipping (23° C.) | ND | 17,800 cP | 19,900 cP | 1,130 cP | 310 cP | 75 cP |
| Viscosity after whipping (23° C.) | ND | 11,000 cP | ND | 6,000 cP | 3,600 cP | 210 cP |
| Emulsified state | o/w | o/w | o/w | o/w | o/w | o/w |

[Sensory Evaluation]

Regarding the following items, the water-containing foam-containing chocolate of each of Examples 1 to 7 was subjected to sensory evaluation by five experts. The results are shown in Table 2.

Shape retention property: Shape of the water-containing foam-containing chocolate after being taken out of a freezer at −18° C. and left for 30 minutes at 22° C.
3: Shape remains unchanged
2: Shape is partially deformed
1: Shape cannot be maintained, and is collapsed Melting in the mouth: Evaluation by eating at 22° C. of the water-containing foam-containing chocolate immediately after being taken out of a freezer at −18° C.
3: Good
2: Fair
1: Poor Hardness: Hardness at time of eating at 22° C. of the water-containing foam-containing chocolate after being taken out of a freezer at −18° C.
5: Such hardness that the water-containing foam-containing chocolate immediately after being taken out of a freezer at −18° C. can be chewed without resistance
4: Such hardness that the water-containing foam-containing chocolate immediately after being taken out of a freezer at −18° C. can be chewed easily
3: Such hardness that the water-containing foam-containing chocolate immediately after being taken out of a freezer at −18° C. can be chewed
2: Such hardness that the water-containing foam-containing chocolate immediately after being taken out of a freezer at −18° C. is slightly hard but can be chewed
1: Such hardness that the water-containing foam-containing chocolate immediately after being taken out of a freezer at −18° C. is hard and cannot be chewed Feeling of chocolate: Comparison with commercially available raw chocolate that is distributed at normal temperature or under a refrigerated state
3: Feeling of chocolate is the same
2: Slightly inferior
1: Feeling of chocolate is weak Coldness: Coldness at time of eating of the water-containing foam-containing chocolate in a frozen state
5: Coldness is felt significantly
4: Coldness is felt slightly
3: Coldness is felt
2: Coldness is not felt slightly
1: Coldness is not felt In view of the object of the present invention to provide a water-containing foam-containing chocolate, which enables flavor of chocolate to be sufficiently sensed even in a freezing temperature range, which has new texture that is smooth, fluffy, and soft, and which has processability at room temperature and an excellent shape retention property at room temperature and in the freezing temperature range, in the above-mentioned sensory evaluation, scores of 2 or more are acceptable in the shape retention property, melting in the mouth, and feeling of chocolate, and scores of 3 or more are acceptable in the hardness. Regarding the coldness, the preferred coldness varies depending on the purpose of a product, and hence no acceptable range is provided.

TABLE 2

|  | Example 1 | Example 2 | Example 3 | Example 4 | Example 5 | Example 6 | Example 7 | Example 8 |
|---|---|---|---|---|---|---|---|---|
| Shape retention property | 2 | 3 | 3 | 3 | 3 | 2 | 2 | 2 |
| Melting in mouth | 3 | 2 | 2 | 3 | 3 | 3 | 3 | 3 |

TABLE 2-continued

|  | Example 1 | Example 2 | Example 3 | Example 4 | Example 5 | Example 6 | Example 7 | Example 8 |
|---|---|---|---|---|---|---|---|---|
| Hardness | 4 | 3 | 3 | 5 | 4 | 3 | 2 | 5 |
| Feeling of chocolate | 3 | 3 | 3 | 3 | 3 | 2 | 2 | 2 |
| Coldness | 5 | 2 | 2 | 3 | 5 | 5 | 5 | 5 |

From the foregoing, the water-containing foam-containing chocolate of an oil-in-water type of each of Examples 1 to 6 was able to obtain the intended effects of the present invention.

Example 8

Production of Water-Containing Foam-Containing Chocolate Containing Meringue

A water-containing foam-containing chocolate of an O/W type containing 38 wt % of water was obtained in the same manner as in Example 1. The specific gravity of the water-containing foam-containing chocolate was 0.62.

Separately, meringue having a specific gravity of 0.21 formed of egg white, granulated sugar, and water was prepared, and the water-containing foam-containing chocolate prepared in the foregoing and the meringue were mixed at a weight ratio of 1:1 to obtain a water-containing foam-containing chocolate containing meringue.

The physical properties of the water-containing foam-containing chocolate containing meringue were measured in the same manner as in Example 1. The loads at which the distortion rates at −18° C. and 23° C. were 40% were 0.69 N and 0.11 N, respectively. The specific gravity was 0.35. The ratio of air bubbles each having a circle-equivalent diameter of 30 μm or more and 50 μm or less was 54%.

In addition, the results obtained by subjecting the water-containing foam-containing chocolate containing meringue to sensory evaluation by five experts in the same manner as in Examples 1 to 7 are shown in Table 2. As shown in Table 2, the water-containing foam-containing chocolate containing meringue of this Example was able to obtain the intended effects of the present invention.

As described above, when the water-containing chocolate of an O/W type containing water in a specific amount is whipped, the water-containing foam-containing chocolate, which enables flavor of chocolate to be sufficiently sensed even in the freezing temperature range, and which exhibits new texture that is smooth, fluffy, and soft, can be provided.

This application claims the benefit of priority from Japanese Patent Application No. 2018-096461, filed on May 18, 2018, the content of which is incorporated herein by reference.

The invention claimed is:

1. A water-containing foam-containing chocolate of an oil-in-water type comprising 30 wt % or more and 40 wt % or less of water,
wherein the water-containing foam-containing chocolate has a load of 1.72 N or more and 6.11 N or less at which a distortion rate at −18° C. is 40%.

2. The water-containing foam-containing chocolate according to claim 1, wherein the water-containing foam-containing chocolate has a specific gravity at room temperature of 0.59 or more and 0.69 or less.

3. A method of producing a water-containing foam-containing chocolate according to claim 1 comprising whipping a water-containing chocolate of an oil-in-water type.

* * * * *